(12) United States Patent
Seo

(10) Patent No.: US 12,468,211 B2
(45) Date of Patent: Nov. 11, 2025

(54) CAMERA MODULE

(71) Applicant: LG INNOTEK CO., LTD., Seoul (KR)

(72) Inventor: Eun Sung Seo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 465 days.

(21) Appl. No.: 17/996,679

(22) PCT Filed: Apr. 20, 2021

(86) PCT No.: PCT/KR2021/004908
§ 371 (c)(1),
(2) Date: Oct. 20, 2022

(87) PCT Pub. No.: WO2021/215775
PCT Pub. Date: Oct. 28, 2021

(65) Prior Publication Data
US 2023/0229061 A1   Jul. 20, 2023

(30) Foreign Application Priority Data

Apr. 20, 2020  (KR) .................. 10-2020-0047483

(51) Int. Cl.
*G03B 13/36* (2021.01)
*G02B 7/02* (2021.01)
(Continued)

(52) U.S. Cl.
CPC ............. *G03B 13/36* (2013.01); *G02B 7/022* (2013.01); *G03B 5/00* (2013.01); *G03B 30/00* (2021.01); *G03B 2205/0007* (2013.01)

(58) Field of Classification Search
None
See application file for complete search history.

(56) References Cited

U.S. PATENT DOCUMENTS

2014/0293440 A1  10/2014 Okawa
2015/0002702 A1   1/2015 Hu et al.
(Continued)

FOREIGN PATENT DOCUMENTS

JP   2013-167898 A    8/2013
JP   2013-210550 A   10/2013
(Continued)

OTHER PUBLICATIONS

International Search Report dated Jul. 28, 2022 in International Application No. PCT/KR2021/004908.
(Continued)

*Primary Examiner* — Rodney E Fuller
(74) *Attorney, Agent, or Firm* — SALIWANCHIK, LLOYD & EISENSCHENK

(57) ABSTRACT

A camera module is provided, including: a fixed part; a moving part which moves relative to the fixed part in an optical axis direction; a first driving part which moves the moving part within a first maximum speed; and a second driving part which moves the moving part within a second maximum speed, wherein the first driving part and the second driving part move the moving part in the optical axis direction, and the second maximum speed is greater than the first maximum speed.

9 Claims, 15 Drawing Sheets

(51) Int. Cl.
  *G03B 5/00*   (2021.01)
  *G03B 30/00*  (2021.01)

(56) References Cited

U.S. PATENT DOCUMENTS

2017/0041552 A1    2/2017  Calpe Maravilla et al.
2023/0254561 A1*   8/2023  Seo .......................... G03B 3/10
                                                         359/554

FOREIGN PATENT DOCUMENTS

| KR | 10-2006-0092067 A | 8/2006 |
| KR | 10-2007-0021027 A | 2/2007 |
| KR | 10-1333186 B1 | 11/2013 |
| KR | 10-2020-0003762 A | 1/2020 |
| WO | 2017/164435 A1 | 9/2017 |
| WO | 2020/050650 A1 | 3/2020 |

OTHER PUBLICATIONS

Supplementary European Search Report dated Apr. 17, 2024 in European Application No. 21793190.6.
Murphy, M. et al., "Lens Drivers Focus on Performance in High-Resolution Camera Modules," Analog Dialogue 40-11, Nov. 2006, pp. 1-3.
Office Action dated Apr. 1, 2025 in Japanese Application No. 2022-563401.

* cited by examiner

CAMERA MODULE

CROSS-REFERENCE TO RELATED APPLICATIONS

This application is the U.S. national stage application of International Patent Application No. PCT/KR2021/004908, filed Apr. 20, 2021, which claims the benefit under 35 U.S.C. § 119 of Korean Application No. 10-2020-0047483, filed Apr. 20, 2020, the disclosures of each of which are incorporated herein by reference in their entirety.

TECHNICAL FIELD

The present invention relates to a camera module.

BACKGROUND ART

Cameras are apparatuses which capture images or moving images of subjects and are installed in portable devices, drones, vehicles, and the like. In order to improve the quality of an image, a camera device or camera module may have an image stabilization (IS) function that corrects or inhibits image shake caused by user movement, an auto focusing (AF) function that automatically adjusts a distance between an image sensor and a lens so as to arrange the focal length of the lens, and a zooming function that increases or decreases a magnification so as to capture an image of a subject from a long distance.

Meanwhile, when the number of pixels of the image sensor increases, the resolution increases, and the size of a pixel decreases. As the size decreases, the amount of light received by a pixel for the same time decreases. Accordingly, as the number of pixels of a camera increases, an image shake phenomenon caused by hand shake occurring due to a decrease in shutter speed in a dark environment may more severely occur. An optical image stabilization (OIS) technology for correcting movement by changing a path of light is a typical image stabilization technology.

According to the general OIS technology, the movement of a camera can be detected by a gyro sensor or the like, and then a lens or a camera module including a lens and an image sensor can be tilted or moved based on the detected movement. When the lens or the camera module including the lens and the image sensor is tilted or moved for an OIS function, a space for tilting or moving needs to be additionally secured around the lens or the camera module.

Meanwhile, an actuator for the OIS may be disposed around the lens. In this case, the actuator for the OIS may include an actuator in charge of tilting on two axes perpendicular to an optical axis.

In addition, due to recent needs for ultra-slim and ultra-small camera devices, there have been many spatial restrictions on the arrangement of the actuator for the OIS and the like, and there is a problem that it is difficult for the lens or the camera module including the lens and the image sensor to secure a sufficient space for tilting or moving for the OIS. In addition, as the number of pixels of the camera increases, it is preferable that a size of the lens increase to increase the amount of receiving light, but there may be a limit on increasing the size of the lens due to a space occupied by the actuator for the OIS.

In addition, there is a problem that it is difficult to easily performing the AF function in which the focal length of the lens is adjusted during image capturing.

TECHNICAL PROBLEM

The present invention is directed to providing a camera module which performs auto focusing at high speed during image capturing.

In addition, the present invention is directed to providing a camera module which prevents a shake of an image according to a change in field of view during image capturing.

In addition, the present invention is directed to providing a camera module which inhibits a shake of an image according to a change in field of view during image capturing.

TECHNICAL SOLUTION

One aspect of the present invention provides a camera module including a fixed part, a moving part which moves relative to the fixed part in an optical axis direction, a first driving part which moves the moving part at a first maximum speed or lower, and a second driving part which moves the moving part at a second maximum speed or lower, wherein the first driving part and the second driving part move the moving part in the optical axis direction, and the second maximum speed is higher than the first maximum speed.

The moving part may be repeatedly moved and stopped for a first time section by the first driving part and the second driving part.

The fixed part may include at least one of a housing and a base, and the moving part may include at least one of a lens part and an image sensor.

The lens part may be disposed in the housing, the lens part may include a lens holder and a lens assembly disposed in the lens holder, and the image sensor may be disposed in the base.

A first moving direction of the moving part due to the first driving part may be opposite to a second moving direction of the moving part due to the second driving part for an exposure time.

The moving part may be linearly moved by the first driving part.

The moving part may be vertically moved by the second driving part in each period of a second time section.

The moving part may be moved to an original point by the second driving part in every second time section.

The second driving part may be disposed between the moving part and the first driving part and connected to the moving part and the first driving part.

The first time section may be smaller than a reciprocal number of the preset number of playback frames per second (FPS).

ADVANTAGEOUS EFFECTS

According to embodiments, the present invention can provide a camera actuator applicable to an ultra-slim camera, an ultra-small camera, and a high-resolution camera. Particularly, even without increasing an overall size of the camera device, an actuator for optical image stabilization (OIS) can be effectively disposed.

According to the embodiments, a camera module which performs auto focusing at high speed even during image capturing can be implemented.

In addition, the present invention can implement a camera module which inhibits a shake of an image according to a change in field of view during image capturing.

In addition, the present invention can implement the camera module which performs auto focusing at more frames per second (FPS) than FPS of image capturing so as to adjust a focal length without an input of a user.

MODES OF THE INVENTION

Figure 1:
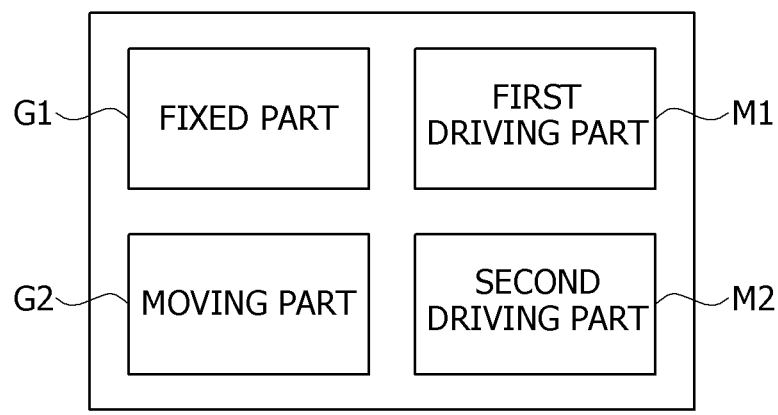
FIG. 1 is a schematic view illustrating a camera module according to an embodiment of the present invention.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

The terminology used herein is for the purpose of describing particular embodiments only and is not intended to limit the present invention. The singular forms are intended to include the plural forms, unless the context clearly indicates otherwise. In the present specification, it should be understood that the terms "comprise," "comprising," "include," and/or "including," when used herein, specify the presence of stated features, numbers, steps, operations, elements, components, and/or combinations thereof but do not preclude the presence or addition of one or more other features, numbers, steps, operations, elements, components, and/or combinations thereof.

Unless otherwise defined, all terms including technical and scientific terms used herein have meanings which are the same as meanings generally understood by those skilled in the art. Terms, such as those defined in generally used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components that are the same or correspond to each other will be denoted by the same or corresponding reference numerals in all drawings, and redundant descriptions will be omitted.

FIG. 1 is a schematic view illustrating a camera module according to an embodiment of the present invention.

Referring to FIG. 1, a camera module 1000 according to the embodiment of the present invention may include a fixed part G1, a moving part G2, a first driving part M1, and a second driving part M2.

The fixed part G1 may include fixed components in the camera module 1000. That is, the fixed part G1 may include components which do not move when auto focusing (AF) and optical image stabilization (OIS) are performed. Particularly, in the present invention, the fixed part G1 may include components which do not move when the AF is performed.

For example, in the camera module 1000 according to the embodiment, the fixed part G1 may include at least one of a housing and a base. In addition, as described above, the fixed part G1 may also have a concept including all components which do not move when the AF and the OIS are performed.

The moving part G2 may include moving components in the camera module 1000. That is, the moving part G2 may include components which move when the AF and the OIS are performed. Particularly, in the present invention, the moving part G2 may include components which move when the AF is performed. Accordingly, in the embodiment, the moving part G2 may include components which move in an optical axis direction. In other words, the moving part G2 may include components which move in a direction parallel to the optical axis direction.

For example, in the camera module 1000 according to the embodiment, the moving part G2 may include at least one of a lens part and an image sensor. In addition, as described above, the moving part G2 may have a concept including all components which move when the AF and the OIS are performed.

The first driving part M1 and the second driving part M2 may be connected to the fixed part G1 and the like and move the moving part G2 so that the moving part G2 moves relative to the fixed part G1. In this case, the first driving part M1 and the second driving part M2 may move the moving part G2 in a direction corresponding (for example, parallel) to the optical axis direction.

The first driving part M1 and the second driving part M2 may include various actuators. For example, each of the first driving part M1 and the second driving part M2 may include one among a voice coil motor (VCM) actuator, an actuator driven by a piezoelectric force, and a microelectromechanical systems (MEMS) actuator driven in a capacitance manner.

More specifically, maximum speeds of the first driving part M1 and the second driving part M2 for moving the moving part G2 may be different from each other.

In the embodiment, the first driving part M1 may move the moving part G2 at a first maximum speed or lower. In addition, the second driving part M2 may move the moving part G2 at a second maximum speed or lower. In addition, the second maximum speed may be higher than the first maximum speed.

In other words, minimum times of the first driving part M1 and the second driving part M2 for moving the moving part G2 to the same distance may be different. For example, the minimum time of the first driving part M1 may be longer than the minimum time of the driving part M2 for moving the moving part G2 to a certain distance.

Alternatively, times of the first driving part M1 and the second driving part M2 to enter normal states after driving signals are applied or time differences (hereinafter, driving time differences) between 10% of the normal states and 90% of the normal states of the first driving part M1 and the second driving part M2 may be different. That is, the driving time difference of the first driving part M1 may be longer than the driving time difference of the second driving part M2.

Accordingly, in the present specification, the first maximum speed and the second maximum speed are maximum instantaneous speeds For example, the first driving part M1 may be a VCM. In addition, the second driving part M1 may be a piezo type actuator having a higher maximum instantaneous speed than the VCM and using a piezoelectric force.

Alternatively, the first driving part M1 may be a VCM. In addition, the second driving part M1 may be a shape-memory alloy (SMA) type actuator having a higher maximum instantaneous speed than the VCM.

Alternatively, the first driving part M1 may be a VCM. In addition, the second driving part M1 may be an actuator, which changes an interface of a liquid lens and has a higher maximum instantaneous speed than the VCM.

Alternatively, the first driving part M1 may be an SMA type actuator. In addition, the second driving part M1 may be a piezo type actuator having a higher maximum instantaneous speed than the SMA type actuator.

Alternatively, the first driving part M1 may be an actuator which provides interface changes in a liquid lens. In addition, the second driving part M1 may be a piezo type actuator having a higher maximum instantaneous speed than the first driving part M1 and using a piezoelectric force.

Alternatively, the first driving part M1 may be an actuator which provides interface changes in a liquid lens. In addition, the second driving part M1 may be a piezo type actuator having a higher maximum instantaneous speed than the first driving part M1 and using a piezoelectric force.

Alternatively, the first driving part M1 may be a VCM. In addition, the second driving part M1 may be an SMA type actuator having a higher maximum instantaneous speed than the VCM. Additional embodiments will be described below.

Figure 2:
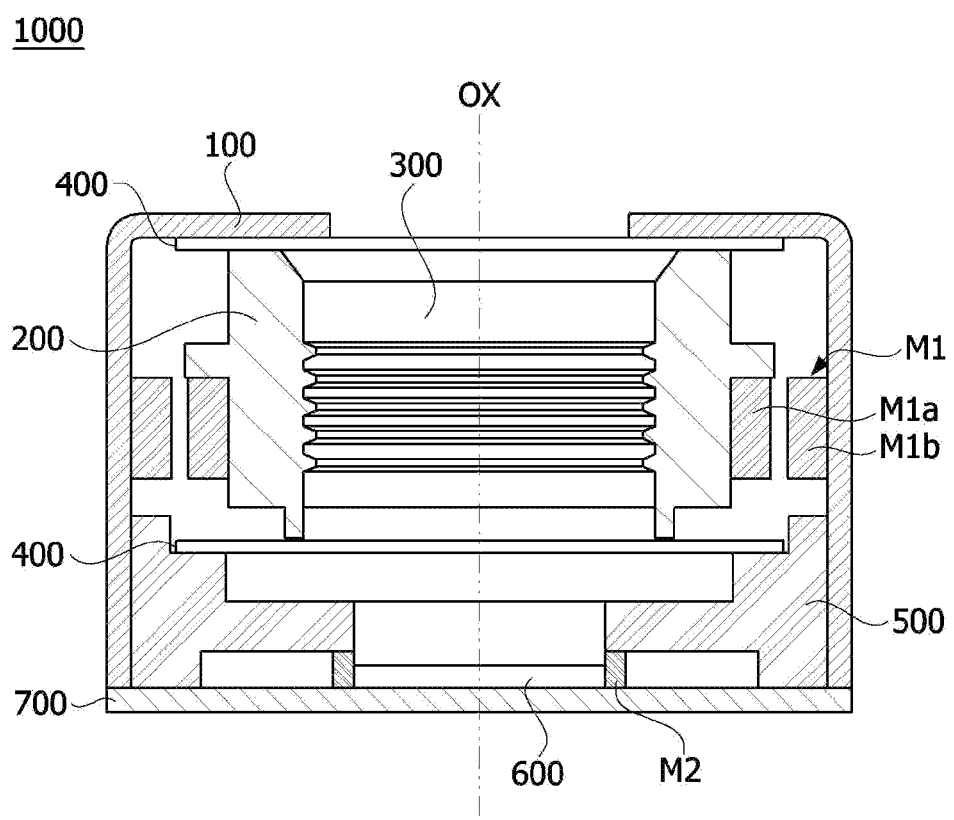
FIG. 2 is a configuration diagram illustrating a camera module according to a first embodiment.

FIG. 2 is a configuration diagram illustrating a camera module according to a first embodiment.

Referring to FIG. 2, the camera module according to the first embodiment may include a housing 100, a lens part including a lens holder 200 and a lens assembly 300, elastic members 400, a base 500, an image sensor 600, a first driving part M1, and a second driving part M2.

The housing 100 may be positioned at an outermost side of a camera module 1000. The housing 100 may protect components from external foreign matter. In addition, the housing 100 may be formed of a material capable of protecting other components in the housing 100 from an external electromagnetic wave. Accordingly, the reliability of the camera module can be improved.

The housing 100 may include a hole therein. The lens part, which will be described below, may be seated in the hole. The housing 100 and the lens part may be connected by the first driving part M1. The lens part may move along an optical axis OX by the first driving part M1.

The present embodiment will be described based on the housing 100 and the lens part, which are connected by the first driving part M1, and the base 500 and the image sensor 600 which are connected by the second driving part M2. However, in the present invention, since the first driving part M1 and the second driving part M2 move moving parts in an optical axis direction and are connected to fixed parts, components of the moving parts or the fixed parts connected to the first driving part M1 and the second driving part M2 may be changed. Specific related embodiments will be described through a second embodiment and a modified embodiment which will be described below.

The lens part may be disposed in the hole of the housing 100. The lens part may include the lens holder 200 and the lens assembly 300.

The lens holder 200 may be seated in the hole in the housing 100. In addition, the lens holder 200 may include a hole. Particularly, the lens holder 200 may include the hole passing through the lens holder 200 in the optical axis direction. For example, an inner circumferential surface of the lens holder 200 may include a screw thread corresponding to a screw thread formed on an outer circumferential surface of the lens assembly 300. However, the present invention is not limited to such a shape. For example, various elements such as an elastic member (for example, a leaf spring), a guide part (for example, a ball) and a pin may be disposed between the lens holder 200 and the lens assembly 300, and accordingly, the lens holder 200 and the lens assembly 300 may be easily coupled. Hereinafter, the embodiment will be described based on the elastic members 400. In addition, such a description about such coupling may be applied to other fixed parts and moving parts in the same way.

The lens assembly 300 may be disposed in the hole of the lens holder 200. The lens assembly 300 may include a plurality of lenses. In addition, the plurality of lenses may include a fixed lens, of which a position is fixed, and a moving lens which moves in the optical axis direction. Alternatively, all the plurality of lenses may also be moving parts.

The elastic member 400 may be connected to the housing 100 and the lens holder 200. In the embodiment, the housing 100 and the lens holder 200 may be coupled to each other through the elastic member 400. The elastic member 400 and the housing 100, or the lens holder 200 and the elastic member 400 may be coupled by an adhesive or thermal fusion. The adhesive may be formed of an epoxy to be cured by at least one among ultraviolet (UV) light, heat, and a laser.

In addition, the elastic member 400 may be disposed between the lens holder 200 and the base 500. Alternatively, the elastic member 400 may also be disposed between the housing 100 and the base 500. In this case, a magnet or coil for performing OIS may be positioned on each of the housing 100 and the base 500. However, the present invention is not limited thereto, and a magnet or coil for OIS may also be additionally positioned on each of the lens holder 200 and the housing 100. Alternatively, a magnet or coil for performing OIS may also be positioned on the image sensor 600.

The base 500 may be disposed in the housing 100. Alternatively, the base 500 may be positioned in a lower portion of the housing 100. The base 500 may include a hole in the optical axis direction. The hole of the base 500 may overlap the lens assembly 300 in the optical axis direction.

The base 500 may be coupled to the lens holder 200 through the elastic member 400. In addition, the elastic member 400 and the lens holder 200, or the base 500 and the elastic member 400 may be coupled by an adhesive or thermal fusion. The adhesive may be formed of an epoxy to be cured by at least one among UV light, heat, and a laser.

The image sensor 600 may be positioned in the hole of the base 500. The image sensor 600 may be disposed at a position corresponding to the lens assembly 300. The image sensor 600, along with the base 500, may be disposed on a substrate 700. In this case, the camera module may further include the substrate 700.

The image sensor 600 may be electrically connected to the substrate 700. The image sensor 600 may be coupled to the substrate 700 in a flip chip manner. The image sensor 600 may be coupled to the substrate 700 by a soldering process.

In addition, the image sensor 600 may be disposed to have the same optical axis as the lens. That is, the optical axis of the image sensor 600 may be aligned with the optical axis of the lens. The image sensor 600 may convert light incident on an effective imaging region of the image sensor 600 into an electric signal. For example, the image sensor 600 may be any one among a charge coupled device (CCD) sensor, a metal oxide semi-conductor (MOS) sensor, a carbon-based polymer dot (CPD) sensor, and a charge-injection device (CID) sensor.

The substrate 700 may be a printed circuit board. The substrate 700 may be electrically connected to a control unit (not shown) of a mobile terminal.

The first driving part M1 may be disposed between the housing 100 and the lens holder 200. The first driving part M1 may include a coil M1a and a magnet M1b. The coil M1a and the magnet M1b may be disposed on the lens holder 200 and the housing 100, respectively, to face each other. Accordingly, the lens holder 200 may move relative to the housing 100 in the optical axis direction. For example, the first driving part M1 may be a VCM. The first driving part M1 may be provided as a plurality of first driving parts M1.

The second driving part M2 may be disposed between the image sensor 600 and the base 500. The second driving part M2 may be a piezo type actuator driven by a piezoelectric force. The second driving part M2 may move the image sensor 600 relative to the base 500 in the optical axis direction by adjusting a size of the second driving part M2.

In addition, the camera module 1000 according to the embodiment may include a controller (not shown). The controller may be disposed on the substrate 700. Alternatively, the controller may be positioned outside the substrate 700. The controller may individually control a direction, an intensity, and an amplitude of a current supplied for driving the first driving part M1 and the second driving part M2. The controller may perform an AF function by controlling the first driving part M1 and the second driving part M2. In addition, the controller may also supply a current to a driving part which performs an OIS function to perform OIS. In addition, the controller may perform AF feedback control and/or OIS feedback control for a lens driving device.

Figure 3:
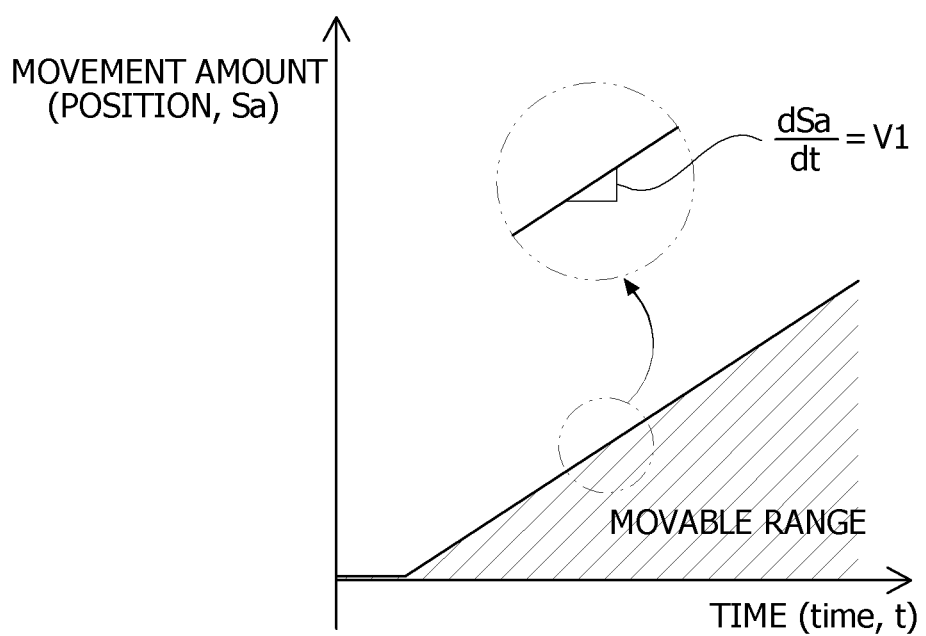
FIG. 3 is a view for describing a first driving part according to an embodiment.
Figure 4:
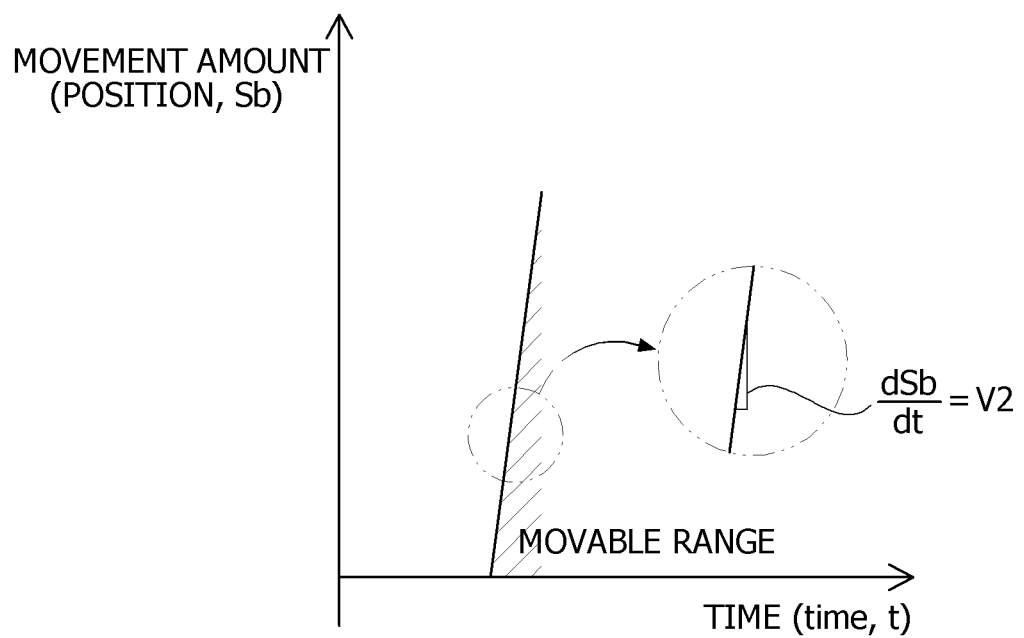
FIG. 4 is a view for describing a second driving part according to the embodiment.

FIG. 3 is a view for describing the first driving part according to the embodiment, and FIG. 4 is a view for describing the second driving part according to the embodiment.

Referring to FIGS. 3 and 4, in the embodiment, the first driving part M1 may move the lens holder 200 at a first maximum speed V1 or lower, and the second driving part M2 may move the image sensor 600 at a second maximum speed V2 or lower.

The first maximum speed V1 and the second maximum speed V2 are instantaneous speeds. Accordingly, the second driving part M2 may provide a larger amount of movement than the first driving part M1 for a certain time. In the present specification, the amount of movement denotes a position of each of the first and second driving parts or a position or distance of the moving part after the moving part is moved by the first and second driving parts.

In addition, since the second maximum speed V2 is higher than the first maximum speed V1, the second driving part M2 may provide a speed range wider than a speed range provided by the first driving part M1. That is, the speed range in which the moving part is allowed to be moved by the second driving part M2 is wider than the speed range in which the moving part is allowed to be moved by the first driving part M1. In addition, the speed range in which the moving part is allowed to be moved by the second driving part M2 may include the speed range in which the moving part is allowed to be moved by the first driving part M1.

Figure 5:
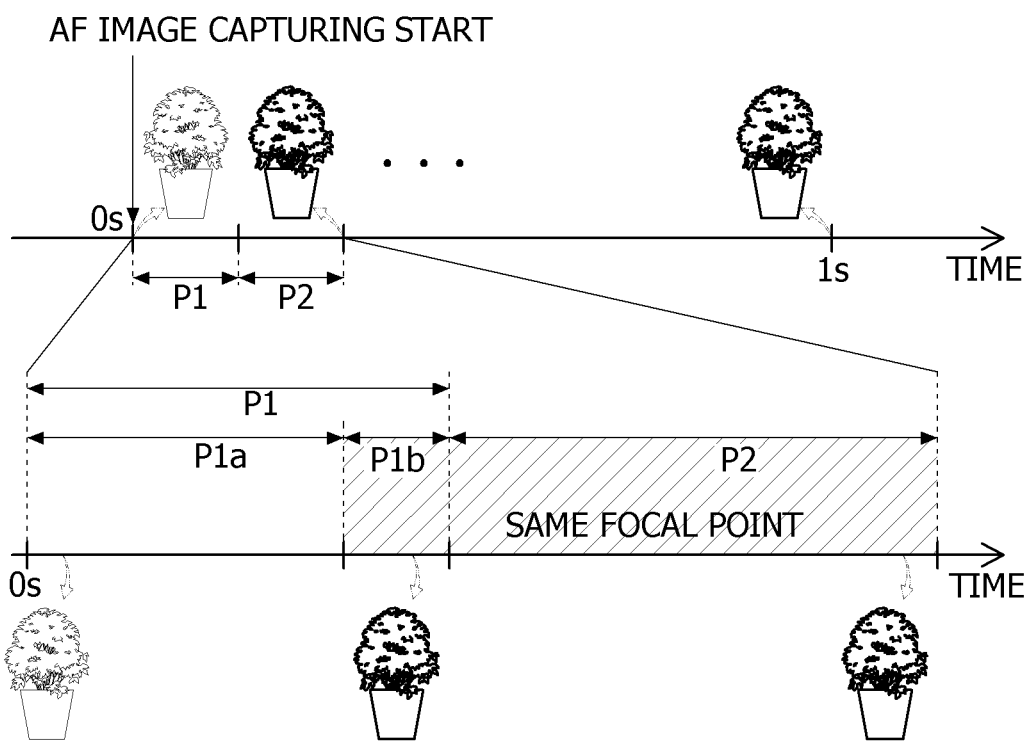
FIG. 5 is a view for describing auto focusing of a camera module according to an embodiment.
Figure 6:
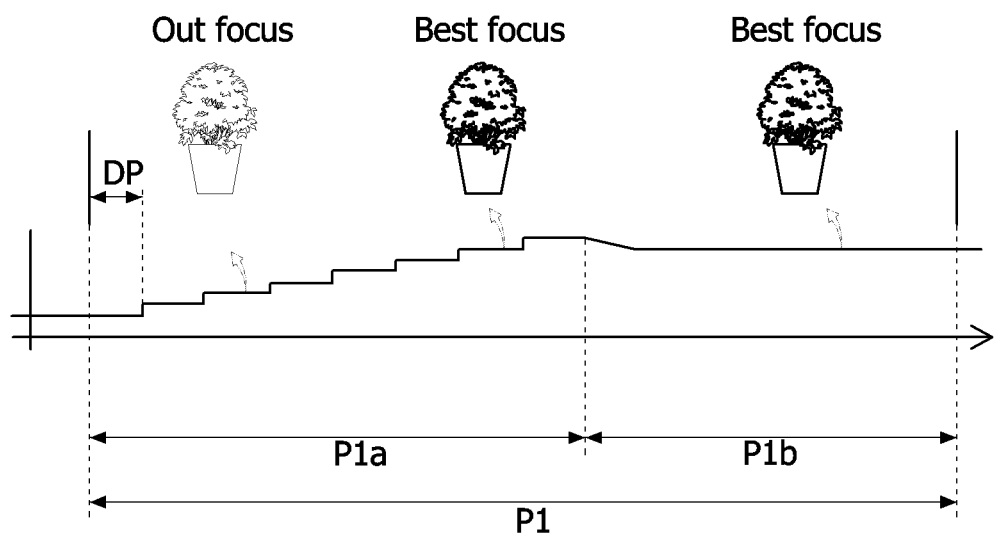
FIG. 6 is a view illustrating a change in amount of movement of a camera module for auto focusing according to an embodiment.
Figure 7:
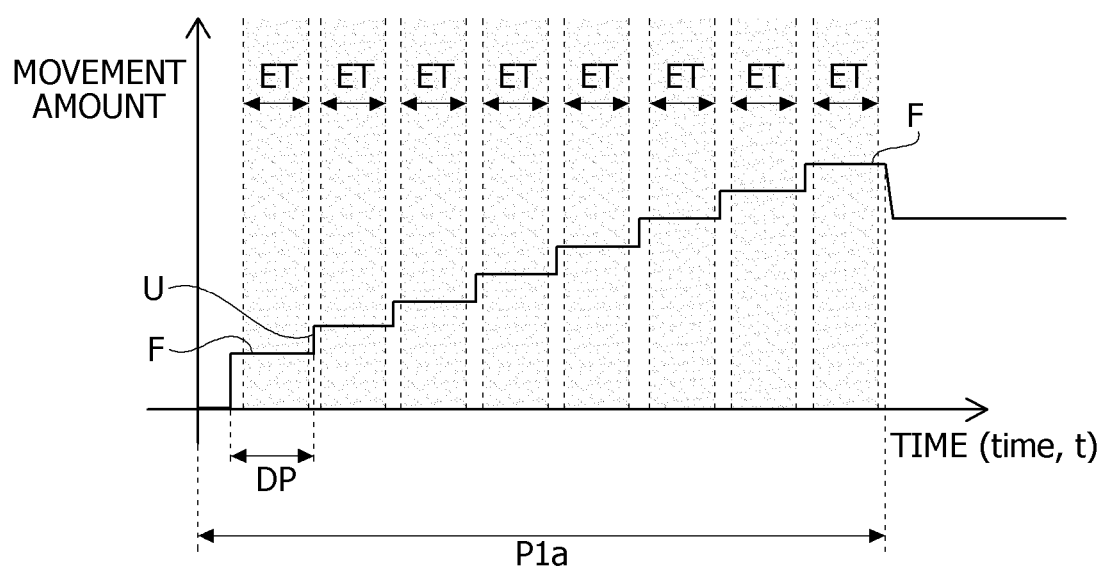
FIG. 7 is a view illustrating an exposure time corresponding to the amount of movement of the camera module for the auto focusing according to the embodiment.
Figure 8:
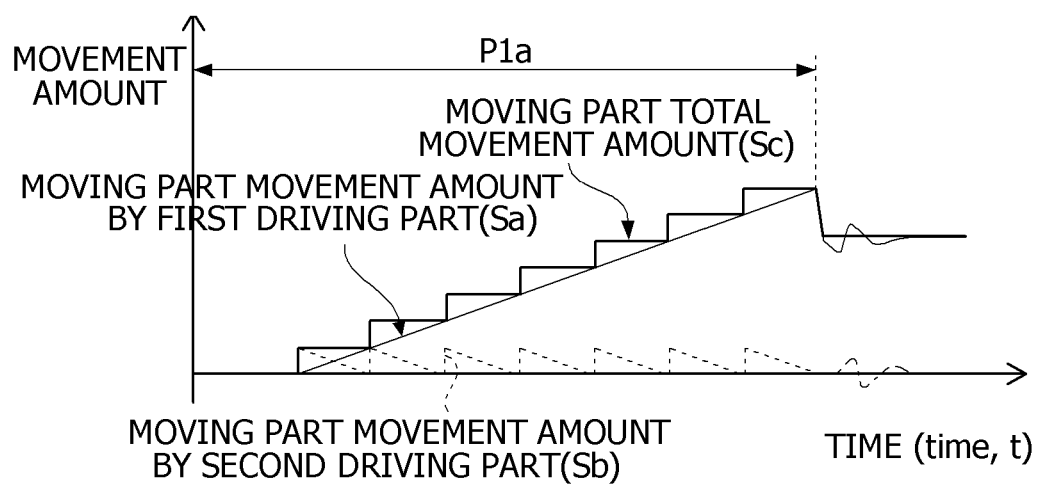
FIG. 8 is a view illustrating amounts of movement of a first driving part and a second driving part in a camera module according to an embodiment.

FIG. 5 is a view for describing AF of the camera module according to the embodiment, FIG. 6 is a view illustrating a change in amount of movement of the camera module for AF according to the embodiment, FIG. 7 is a view illustrating an exposure time corresponding to the amount of movement of the camera module for the AF according to the embodiment, and FIG. 8 is a view illustrating amounts of movement of the first driving part and the second driving part in the camera module according to the embodiment.

Referring to FIG. 5, the camera module according to the embodiment may perform AF at intervals of a predetermined time during image capturing.

More specifically, the camera module may capture an image at, for example, several frames per second (FPS) to several hundreds of FPS during image capturing. In this case, an exposure time for capturing one image is one frame. That is, there are several frames to several hundreds of frames within one second, and several images to several hundreds of images (or pieces of image data) corresponding to frames may be generated by the image sensor.

The camera module according to the embodiment may focus on a subject using an image generated at each frame or using an image of a predetermined frame (AF). For example, focusing may be performed based on a closest region. Alternatively, focusing may be performed based on a farthest region.

The camera module according to the embodiment may perform focusing at a preset frame P1 among a plurality of frames P1 and P2. Hereinafter, as in FIG. 5, the embodiment will be described based on AF exploration which is performed at a first frame in a section of zero seconds to one second after image capturing is started.

That is, the camera module according to the embodiment may set a focal point determined after the frame P1 using the frame P1, at which AF is performed, as a focal point of the frame P2 and capture an image.

In this case, in the camera module according to the embodiment, the frame P1, at which the AF is performed, may include an exploration section P1a and an exposure section P1b.

Referring to FIGS. 6 and 7, in the embodiment, the exploration section P1a may be a time smaller than a reciprocal number of a preset FPS.

In addition, the exploration section P1a may include a plurality of exploration exposure sections ET. In addition, one frame may include the plurality of exploration exposure sections ET. In addition, in the exploration section P1a, a position of the moving part may increase in step increments. In other words, according to the embodiment, the moving part may be repeatedly moved and stopped by the first driving part and the second driving part for a first time section DP. Through this structure, a shake of an image generated in each exploration exposure section ET can be minimized. Accordingly, the camera module according to the embodiment can perform more accurate AF.

In addition, the first time section DP may be shorter than the exploration section P1a. In addition, the first time section DP may be smaller than the reciprocal number of the preset FPS.

In addition, the first time section DP may be longer than the exploration exposure section ET. Accordingly, in a state in which the moving part is stopped, an image for AF may be obtained in each exploration exposure section ET.

In addition, the first time section DP may be one step with respect to a position of the moving part. In other words, since the moving part may move and stop for the first time section DP, the first time section DP may include a stop section F of the moving part and a moving section U of the moving part. In addition, the stop section F of the moving part may correspond to the exploration exposure section ET.

The camera module according to the embodiment may control the first driving part and the second driving part so as to move and stop the moving part in a plurality of every first time section DP within the frame P1 at which AF is performed as described above.

Accordingly, the camera module may move the moving part from a position corresponding to a minimum focal length to a position corresponding to a maximum focal length for the frame P1 in which AF is performed. Alternatively, the camera module may move the moving part from the position corresponding to the minimum focal length to a position close to the position corresponding to the maximum focal length. Through such a structure, the camera module according to the embodiment can provide an image captured through a more accurate focal point to the user by easily performing AF without an input (for example, touching for focusing) of a user during image capturing. In addition, the camera module may inhibit a phenomenon that a moving image shakes according to focus scan.

In addition, the moving part may be moved by the first driving part and the second driving part, and the first driving part and the second driving part may receive digital codes corresponding to a position of the moving part or control signals corresponding thereto. That is, in the camera module, the first driving part and the second driving part may move the moving part using a lookup table in which control signal information for moving the moving part to predetermined positions is stored.

Referring to FIG. 8, in the camera module according to the embodiment, the first driving part and the second driving part may move the moving part. In addition, in the camera module, the first maximum speed of the first driving part may be lower than the second maximum speed of the second driving part.

In the embodiment, the first driving part may linearly move the moving part for the exploration section P1a (Sa). That is, the first driving part may move the moving part at a predetermined speed for the plurality of first time sections DP in the exploration section P1a. According to the first embodiment, the first driving part may move the lens holder for the plurality of first time sections DP. In addition, the first driving part may linearly move the lens holder.

In contrast, the second driving part may move the moving part in each period of a second time section for the exploration section P1a. The second driving part may move the moving part in the optical axis direction, that is, in a vertical direction (Sb). In addition, the second driving part may move the moving part in each period of the second time section. That is, the second driving part may vertically move the moving part in each period of the second time section in the optical axis direction. In this case, the second time section may be the same as the first time section DP.

In addition, the moving part may be moved to an original point at intervals of the second time section by the second driving part. In other words, the moving part may be moved in a second moving direction by the second driving part after being moved in a first moving direction. In this case, the first moving direction is a direction in which the moving part is moved by the first driving part for the exploration exposure section ET, and the second moving direction is a direction opposite to the first moving direction. The first moving direction and the second moving direction are parallel to the optical axis direction.

In addition, more specifically, the moving part may be moved in the second moving direction for the exploration exposure section ET and moved in the first moving direction for a time excluding the exploration exposure section ET in the first time section by the second driving part.

Accordingly, in overall movement, the moving part may repeatedly stop and move at intervals of the first time section or the second time section. In the total movement, the moving part may stop for a time section longer than the exploration exposure section ET in the first time section or the second time section. In addition, in the total movement, the moving part may move for a time section excluding the time section longer than the exploration exposure section ET. In the embodiment, the overall movement of the moving part corresponds to the sum of a position at which the moving part is moved by the first driving part in the optical axis direction and a position at which the moving part is moved by the second driving part in the optical axis direction.

However, in the embodiment, the first driving part may maintain a speed of the moving part for the first time section DP or the exploration exposure section ET. That is, the first driving part may move the moving part at a constant speed for the first time section DP, the exploration exposure section ET, or the exploration section P1a.

In the embodiment, in the camera module, as the moving part is moved in each period of the second time section by the second driving part, the total movement of the moving part may have steps described above. That is, in the overall movement, the moving part may repeatedly move and stop for the first time section DP, and an image may be generated at an increased or decreased position of the moving part in each step (Sc). In addition, the generated image may be used to determine a focal point.

Then, since overall movement/stop of the moving part or movement/stop of the focal point is performed by the second driving part having the higher maximum speed than the first driving part, AF can be performed more accurately and with a high reaction time.

In addition, in the exposure section P1b, the moving part may move to correspond to the focal point obtained using the image generated in each exploration exposure section ET.

Figure 9:
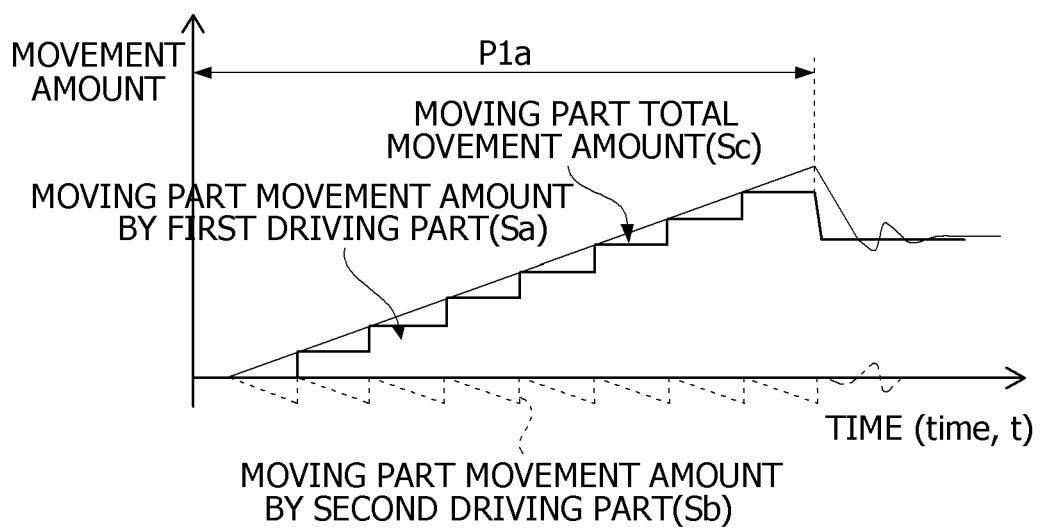
FIG. 9 is a view illustrating amounts of movement of a first driving part and a second driving part in a camera module according to another embodiment.

FIG. 9 is a view illustrating amounts of movement of a first driving part and a second driving part in a camera module according to another embodiment.

Referring to FIG. 9, as described above, in the camera module, the first driving part and the second driving part may move a moving part. That is, the moving part may be moved by the first driving part or the second driving part.

In addition, in the camera module, a first maximum speed of the first driving part may be lower than a second maximum speed of the second driving part.

According to another embodiment, a first moving direction of the moving part due to the first driving part may be opposite to a second moving direction of the moving part due to the second driving part. That is, even when the first moving direction and the second moving direction are parallel to an optical axis direction, the first driving part may move a lens holder toward an image sensor disposed under the lens holder, and the second driving part may move the image sensor toward the lens holder disposed above the image sensor. Alternatively, the first driving part may move the lens holder in a direction from the image sensor toward the lens holder, and the second driving part may move the image sensor toward a substrate disposed under the image sensor.

In the embodiment, the first driving part may linearly move the moving part in the first moving direction for an exploration section P1a.

In addition, the first driving part may move the moving part at a constant speed for a plurality of first time sections DP in the exploration section P1a.

In addition, the first driving part may move the lens holder for the plurality of first time sections DP.

In addition, the second driving part may move the moving part in each period of a second time section for the exploration section P1a. The second driving part may move the moving part in the second moving direction. In addition, the second driving part may move the moving part in each period of the second time section. That is, the second driving part may move the moving part in each period of the second time section in the second moving direction. In this case, the second time section may be the same as the first time section DP described above.

In addition, the moving part may be moved to an original point at intervals of the second time section by the second driving part. In other words, the moving part may be moved in the second moving direction by the second driving part and moved in the first moving direction. More specifically, the moving part may be moved in the second moving direction for an exploration exposure section ET by the second driving part and moved in the first moving direction for a time excluding the exploration exposure section ET in the first time section.

Accordingly, in overall movement, the moving part may repeatedly move and stop at intervals of the first time section or the second time section. In the overall movement, the moving part may stop for a time section longer than the exploration exposure section ET in the first time section or the second time section. In addition, in the overall movement, the moving part may move in a time section excluding the time section longer than the exploration exposure section ET. In the embodiment, the overall movement of the moving part corresponds to the sum of a position at which the moving part is moved in the optical axis direction by the first driving part and a position at which the moving part is moved in the optical axis direction by the second driving part.

In addition, in another embodiment, the first driving part may maintain a speed of the moving part for the first time section DP or the exploration exposure section ET. That is, the first driving part may move the moving part at a constant speed for the first time section DP, the exploration exposure section ET, or the exploration section P1a.

In addition, in the camera module, as the moving part is moved in each period of the second time section by the second driving part, the total movement of the moving part may have steps described above. That is, in the overall movement, the moving part may repeatedly move and stop for the first time section DP, and an image may be generated at an increased or decreased position of the moving part in each step. In addition, the generated image may be used to determine a focal point. Then, since the overall movement/stop of the moving part or movement/stop of the focal point is performed by the second driving part having a higher maximum speed, AF can be performed more accurately and with a high reaction time.

In addition, in an exposure section P1b, the moving part may move to correspond to the focal point obtained using the image generated in each exploration exposure section ET.

Figure 10:
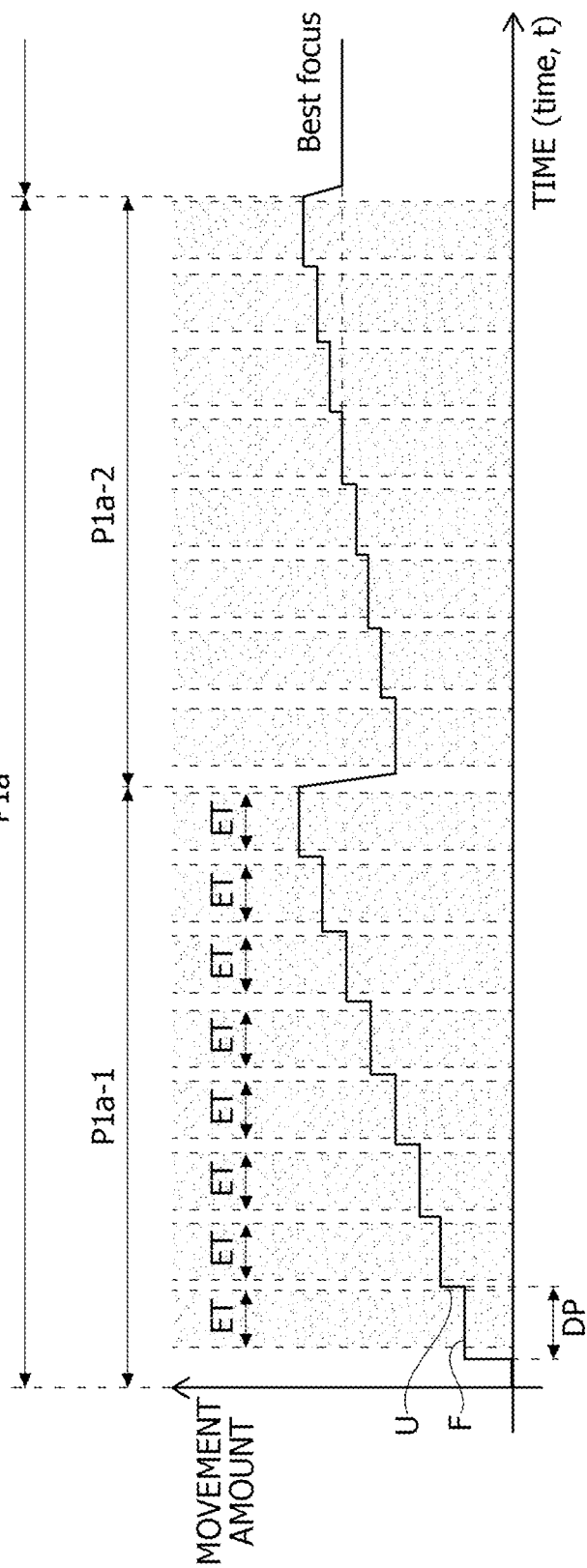
FIG. 10 is a view illustrating a change in amount of movement of a camera module for auto focusing according to still another embodiment.

FIG. 10 is a view illustrating a change in amount of movement of a camera module for AF according to still another embodiment.

Referring to FIG. 10, according to still another embodiment, in the camera module, a first driving part and a second driving part may move a moving part. In addition, in the camera module, a first maximum speed of the first driving part may be lower than a second maximum speed of the second driving part.

However, in the camera module according to still another embodiment, an exploration section P1a may include a first exploration section P1a-1 and a second exploration section P1a-2.

The camera module may move the moving part for the first exploration section P1a-1 in the same manner described above. That is, the first driving part may linearly move the moving part for the first exploration section P1a-1 and the second exploration section P1a-2. The first driving part may move the moving part at a constant speed for a plurality of first time sections DP in the first exploration section P1a-1 and the second exploration section P1a-2. The first driving part may move the moving part at a constant speed or different speeds for the first exploration section P1a-1 and the second exploration section P1a-2.

In contrast, the second driving part may move the moving part in each period of a second time section for the first exploration section P1a-1 and the second exploration section P1a-2. The second driving part may move the moving part in an optical axis direction, that is, in a vertical direction. In addition, the second driving part may move the moving part in each period of the second time section. That is, the second driving part may vertically move the moving part in each period of the second time section in the optical axis direction. In this case, the second time section may be the same as a first time section DP described above.

In addition, the second driving part may move the moving part in each period of the same or different second time sections for the first exploration section P1a-1 and the second exploration section P1a-2.

In addition, the moving part may be moved to an original point at intervals of the second time section by the second driving part. In other words, the moving part may be moved in a first moving direction by the second driving part and moved in a second moving direction.

In addition, in overall movement, the moving part may repeatedly stop and move at intervals of the first time section or the second time section in the first exploration section P1a-1 and the second exploration section P1a-2. In the total movement, the moving part may stop for a time section longer that an exploration exposure section ET in the first time section or the second time section. In addition, in the total movement, the moving part may move for a time section excluding the time section longer than the exploration exposure section ET. In the embodiment, the overall movement of the moving part corresponds to the sum of a position at which the moving part is moved by the first driving part in the optical axis direction and a position at which the moving part is moved by the second driving part in the optical axis direction.

In addition, in the camera module, as the moving part is moved in each period of the second time section by the second driving part, the total movement of the moving part may have steps described above. That is, in the overall movement, the moving part may repeatedly move and stop for the first time section DP, and an image may be generated at an increased or decreased position of the moving part in each step. In addition, the generated image may be used to determine a focal point. Then, since the overall movement/stop of the moving part or movement/stop of the focal point is performed by the second driving part having a higher maximum speed, the camera module can more accurately perform AF with a high reaction time.

In the camera module according to still another embodiment, a primary focal length may be calculated using the image obtained for the first exploration section P1a-1. The primary focal length may be approximately calculated.

In addition, the first driving part and the second driving part may move the moving part for the second exploration section P1a-2 again. In this case, the moving part may be moved at a ratio lower than or equal to a predetermined ratio of the approximately calculated focal length. Accordingly, more accurate AF can be performed.

In addition, a minimum difference in amounts of movement of the moving part stopped by the first driving part and the second driving part for the second exploration section P1a-2 may be smaller. In other words, in still another camera module, minimum amounts of movement of the moving part for exploration exposure sections ET for the first exploration section P1a-1 and the second exploration section P1a-2 may be different.

That is, the minimum amount of movement of the moving part for each exploration exposure section ET for the first exploration section P1a-1 may be greater than the minimum amount of movement of the moving part for each exploration exposure section ET for the second exploration section P1a-2. Accordingly, the camera module according to still another embodiment can provide more accurate AF.

In addition, the moving part may move to correspond to a focal point obtained using an image generated in each exploration exposure section ET of the second exploration section P1a-2 for an exposure section P1b after the second exploration section P1a-2.

Figure 11:
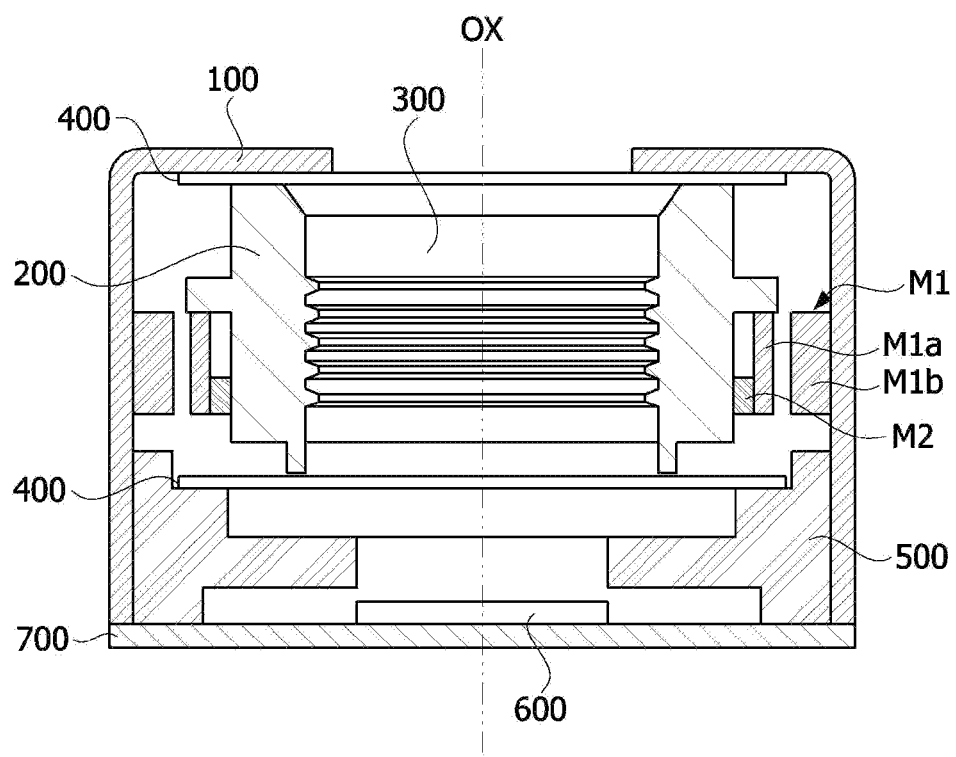
FIG. 11 is a configuration diagram illustrating a camera module according to a second embodiment.

FIG. 11 is a configuration diagram illustrating a camera module according to a second embodiment.

Referring to FIG. 11, the camera module according to the second embodiment may include a housing 100, a lens part including a lens holder 200 and a lens assembly 300, elastic members 400, a base 500, an image sensor 600, a first driving part M1, and a second driving part M2.

The lens part and the image sensor 600 which are moving parts may be moved by the first driving part M1 and the second driving part M2.

In addition, the first driving part M1 and the second driving part M2 may move the moving parts according to various embodiments described above, and the various embodiments may be applied to the second embodiment excluding content below.

The first driving part M1 may be positioned above the base 500 or in the housing 100. In addition, the second driving part M2 may be disposed between the first driving part M1 and the lens part which is the moving part. That is, the first driving part M1 may move the second driving part M2 to move the lens part. Accordingly, in the camera module according to the second embodiment, as the first driving part M1 and the second driving part M2 are connected to each other, when the first driving part M1 moves the moving part in a first moving direction, the second driving part M2 moves the moving part in a second moving direction so that vibration can be reduced. Accordingly, more accurate AF can be performed. In addition, the reliability of the camera module can also be improved.

Figure 12:
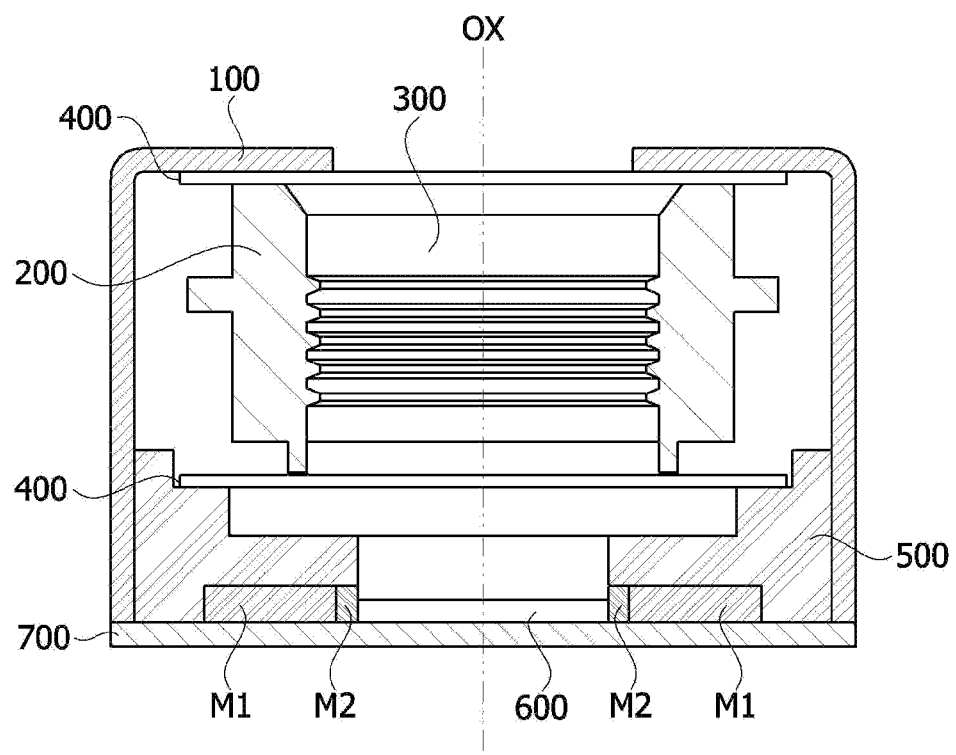
FIG. 12 is a configuration diagram illustrating a camera module according to a third embodiment.

FIG. 12 is a configuration diagram illustrating a camera module according to a third embodiment.

Referring to FIG. 12, the camera module according to the third embodiment may include a housing 100, a lens part including a lens holder 200 and a lens assembly 300, elastic members 400, a base 500, an image sensor 600, a first driving part M1, and a second driving part M2.

The lens part and the image sensor 600 which are moving parts may be moved by the first driving part M1 and the second driving part M2.

In addition, the first driving part M1 and the second driving part M2 may move the moving parts according to various embodiments described above, and the various embodiments may be applied to the third embodiment excluding content below.

The first driving part M1 may be disposed on the base 500 or in the housing 100. In addition, the second driving part M2 may be disposed between the first driving part M1 and the image sensor which is the moving part. That is, the first driving part M1 may move the second driving part M2 to move the image sensor. Accordingly, in the camera module according to the third embodiment, as the first driving part M1 and the second driving part M2 are connected to each other, when the first driving part M1 moves the moving part in a first moving direction, the second driving part M2 may move the moving part in a second moving direction so that vibration due to the movement can be reduced. Accordingly, more accurate AF can be performed. In addition, the reliability of the camera module can also be improved.

Figure 13:
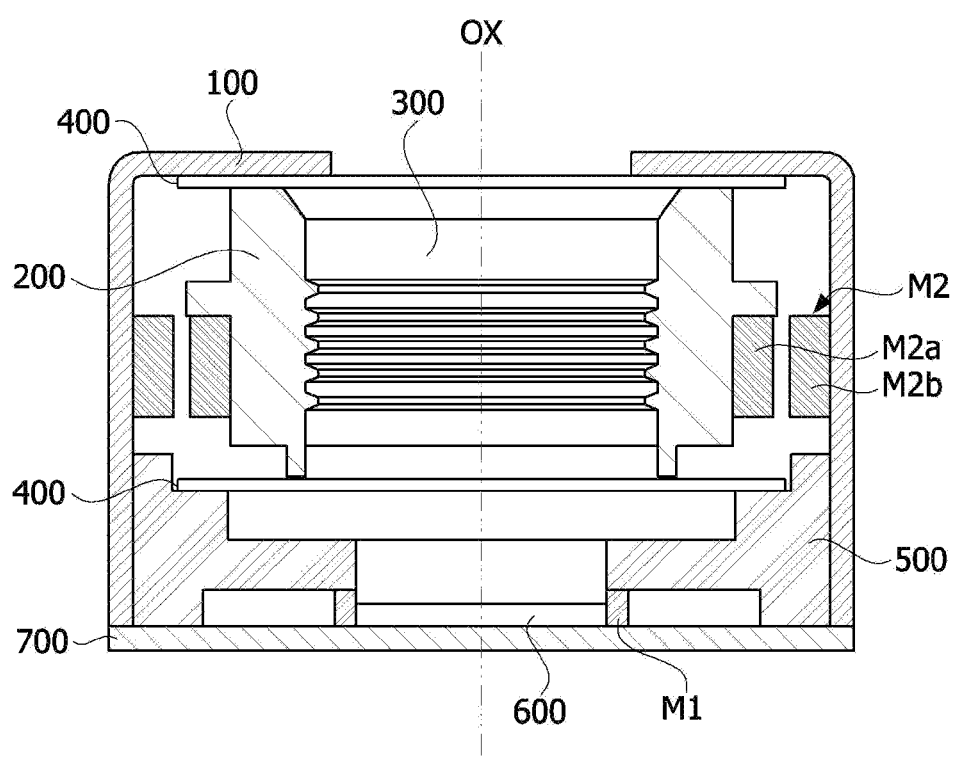
FIG. 13 is a configuration diagram illustrating a camera module according to a fourth embodiment.

FIG. 13 is a configuration diagram illustrating a camera module according to a fourth embodiment.

Referring to FIG. 13, the camera module according to the fourth embodiment may include a housing 100, a lens part including a lens holder 200 and a lens assembly 300, elastic members 400, a base 500, an image sensor 600, a first driving part M1, and a second driving part M2.

The lens part and the image sensor 600 which are moving parts may be moved by the first driving part M1 and the second driving part M2.

In addition, the first driving part M1 and the second driving part M2 may move the moving parts according to various embodiments described above, and the various embodiments may be applied to the fourth embodiment excluding content below.

The first driving part M1 may be disposed on the base 500 or in the housing 100. In addition, the first driving part M1 may move the image sensor 600. In addition, the second driving part M2 may move the lens part. Accordingly, as described above, the first driving part M1 and the second driving part M2 may move different components of the moving parts. In addition, as described above, overall movement of the moving part is the sum of movement of the image sensor and movement of the lens part.

In addition, in the camera module according to the fourth embodiment, as the first driving part M1 and the second driving part M2 are divided, when the first driving part M1 moves the moving part in a first moving direction, the second driving part M2 moves the moving part in a second moving direction, and thus when the first driving part M1 and the second driving part M2 move the moving part in the same direction, an increase in vibration can be inhibited. Accordingly, the reliability of the camera module can be improved.

Figure 14:
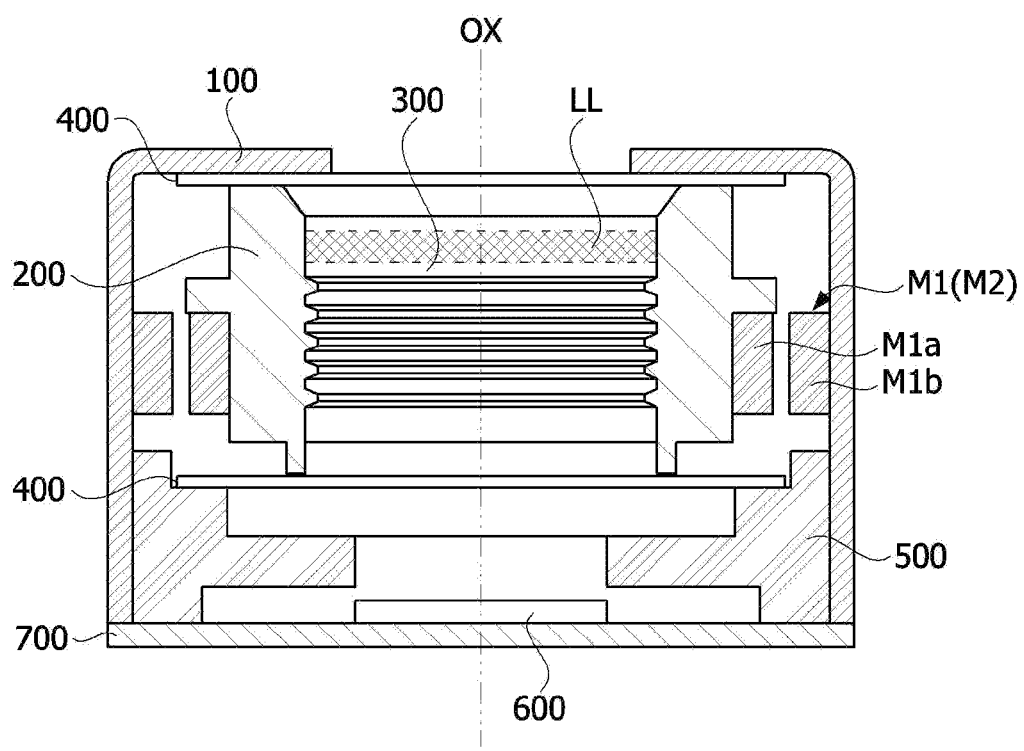
FIG. 14 is a configuration diagram illustrating a camera module according a modified embodiment.

FIG. 14 is a configuration diagram illustrating a camera module according a modified embodiment.

Referring to FIG. 14, the camera module according the modified embodiment may include a housing 100, a lens part including a lens holder 200 and a lens assembly 300, elastic members 400, a base 500, an image sensor 600, and a first driving part M1 or a second driving part M2.

Only one of the first driving part M1 and the second driving part M2 is present and may be connected to the lens part or the image sensor 600 which is a moving part to move at least one of the lens part and the image sensor 600.

The first driving part M1 or the second driving part M2 may move the moving part according to various embodiments described above, and the various embodiments may be applied to the modified embodiment excluding content below.

In addition, in the present embodiment, the lens part may include a liquid lens part LL. The liquid lens part may include a first liquid which is conductive and a second liquid which is not conductive, and an interface at which the first liquid and the second liquid are in contact with each other may be deformed by an applied voltage. In addition, the interface may have different curvatures according to the voltage. Accordingly, an optical path may be changed, and a focal point may also be changed. In other words, the focal point of the liquid lens part may be changed.

The first driving part M1 or the second driving part M2 may be disposed above the base 500 or in the housing 100. In addition, the first driving part M1 or the second driving part M2 may move the lens part or the image sensor 600. For example, the second driving part M2 may move the lens part or the image sensor 600.

In addition, the camera module according the modified embodiment, since the moving part is moved by the first driving part M1 or the second driving part M2, the number of moving parts is minimized, and thus vibrations due to the movement of the moving part can be minimized. Accordingly, the reliability of the camera module can be improved.

Hereinafter, a structure of an electronic device according to the present embodiment will be described.

Figure 15:
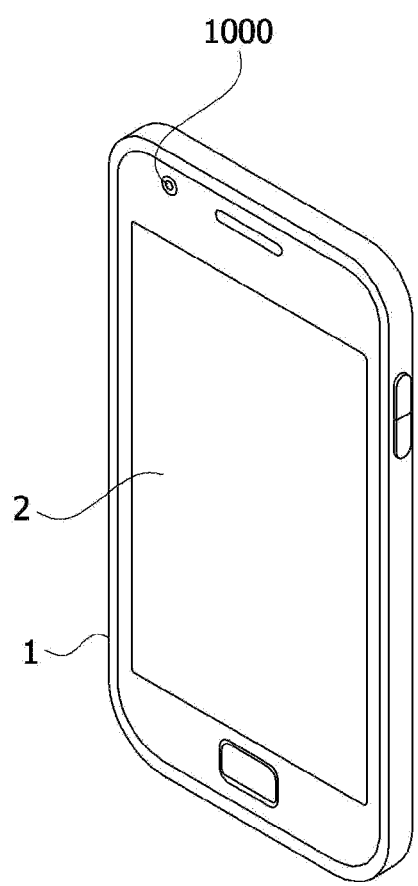
FIG. 15 is a view illustrating an electronic device including a camera module according to an embodiment.

FIG. 15 is a view illustrating an electronic device including a camera module according to an embodiment.

Referring to FIG. 15, the electronic device may be any one among a handphone, a portable phone, a smart phone, a portable communication device, a portable smart device, a digital camera, a laptop computer, a digital broadcasting terminal, a personal digital assistant (PDA), a portable multimedia player (PMP), and a navigation device. However, the types of the electronic device are not limited thereto, and any device for capturing an image may be included in the electronic device.

The electronic device may include a main body 1. The main body 1 may form an exterior of the electronic device. The main body 1 may accommodate a camera module 1000. A display 2 may be disposed on one surface of the main body 1. As an example, the display 2 and the camera module 1000 may be disposed on one surface of the main body 1, and a camera module 1000 may be additionally disposed on the other surface (positioned at a side opposite to one surface) of the main body 1.

The electronic device may include the display 2. The display 2 may be disposed on one surface of the main body 1. The display 2 may output an image captured by the camera module 1000.

The electronic device may include the camera module 1000. The camera module 1000 may be disposed in the main body 1. At least a part of the camera module 1000 may be accommodated in the main body 1. The camera module 1000 may be provided as a plurality of camera modules 1000. The camera modules 1000 may include a dual camera device. The camera module 1000 may be disposed on each of the one surface and the other surface of the main body 1. The camera module 1000 may capture an image of a subject.

While the present invention has been mainly described above with reference to embodiments, it will be understood by those skilled in the art that the present invention is not limited to the embodiments, but the embodiments are only exemplary, and various modifications and applications which are not illustrated above may fall within the range of the present invention without departing from the essential features of the present embodiments. For example, components specifically described in the embodiments may be modified and implemented, and the driving parts described in the present specification may include components which generate forces in order to move the moving part in addition to the components described in the embodiments. In addition, it should be understood that differences related to modifications and applications fall within the scope of the present invention defined by the appended claims.

The invention claimed is:

1. A camera module comprising:
   a fixed part;
   a moving part that moves relative to the fixed part in an optical axis direction;
   a first driving part that moves the moving part at a first maximum speed or at a lower speed, the first maximum speed or the lower speed being a constant speed; and
   a second driving part that moves the moving part at a second maximum speed or at a lower speed,
   wherein the first driving part and the second driving part move the moving part in the optical axis direction, and the second maximum speed is higher than the first maximum speed, wherein the moving part is repeatedly moved and stopped for a first time section by the first driving part and the second driving part, and wherein the first driving part moves the moving part at the first maximum sped or at the lower speed during the first time section.

2. The camera module of claim 1, wherein:

the fixed part includes at least one of a housing and a base; and the moving part includes at least one of a lens part and an image sensor.

3. The camera module of claim 2, wherein:

the fixed part includes the housing and the base, the moving part includes the lens part and the image sensor, the lens part is disposed in the housing;

the lens part includes a lens holder and a lens assembly disposed in the lens holder; and the image sensor is disposed in the base.

4. The camera module of claim 1, wherein a first moving direction of the moving part due to the first driving part is opposite to a second moving direction of the moving part due to the second driving part for an exposure time.

5. The camera module of claim 1, wherein the moving part is linearly moved by the first driving part.

6. The camera module of claim 5, wherein the moving part is vertically moved by the second driving part in each period of a second time section.

7. The camera module of claim 6, wherein the moving part is moved to an original point by the second driving part in every second time section.

8. The camera module of claim 1, wherein the second driving part is disposed between the moving part and the first driving part and connected to the moving part and the first driving part.

9. The camera module of claim 1, wherein a value of the first time section is smaller than a reciprocal number of a preset number of playback frames per second (FPS).

* * * * *